J. P. BARNES.
DRILLING MACHINE.
APPLICATION FILED NOV. 7, 1905.

948,472.

Patented Feb. 8, 1910.
8 SHEETS—SHEET 1.

Witnesses
Edwin L. Bradford
E. Behel

Inventor
Joseph P. Barnes
By A. O. Behel
Attorney

J. P. BARNES.
DRILLING MACHINE.
APPLICATION FILED NOV. 7, 1905.

948,472.

Patented Feb. 8, 1910.
8 SHEETS—SHEET 3.

Witnesses
Edwin L. Bradford
E. Behel

Inventor
Joseph P. Barnes
By A. O. Behel
Attorney,

J. P. BARNES.
DRILLING MACHINE.
APPLICATION FILED NOV. 7, 1905.

948,472.

Patented Feb. 8, 1910.
8 SHEETS—SHEET 4.

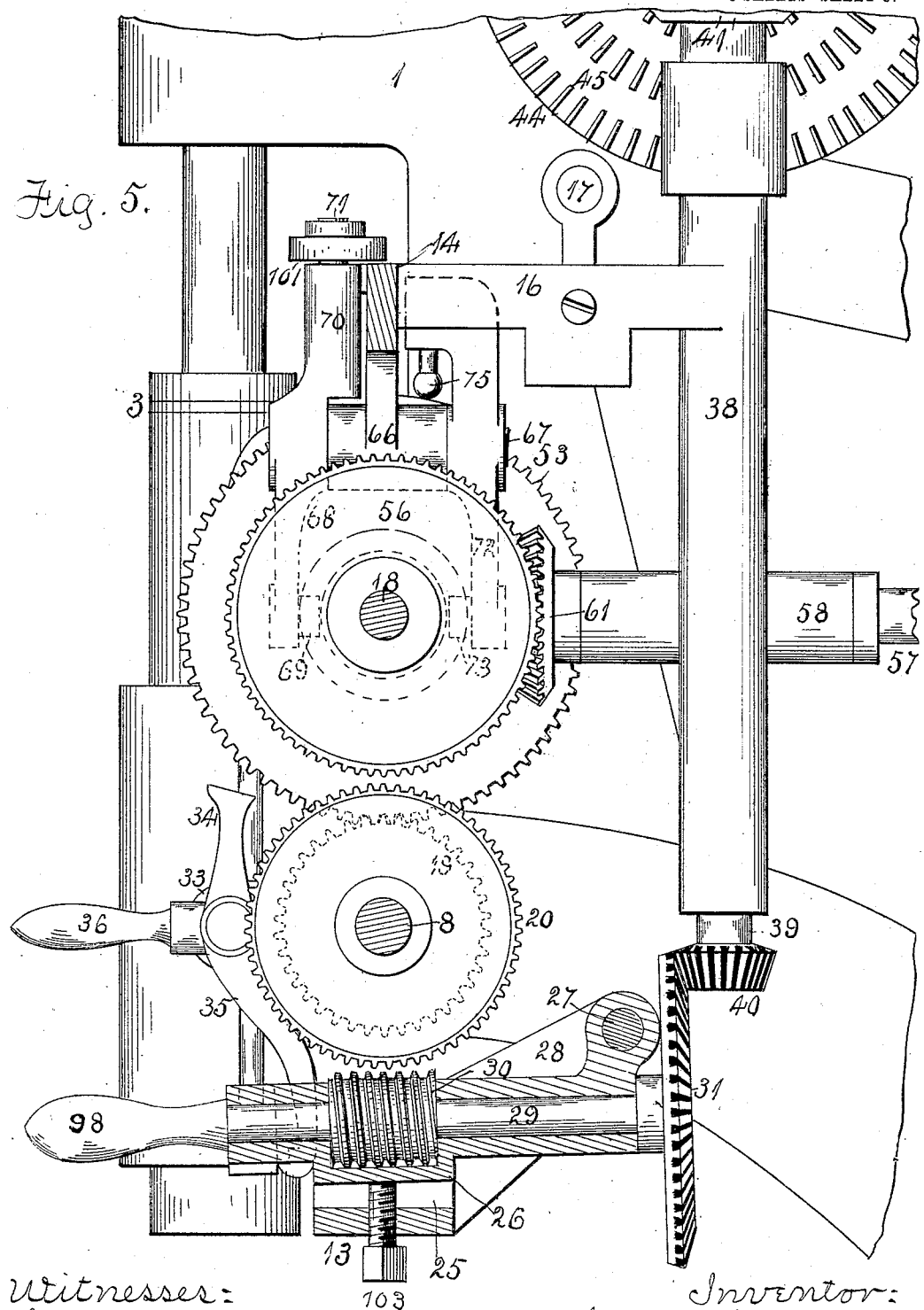

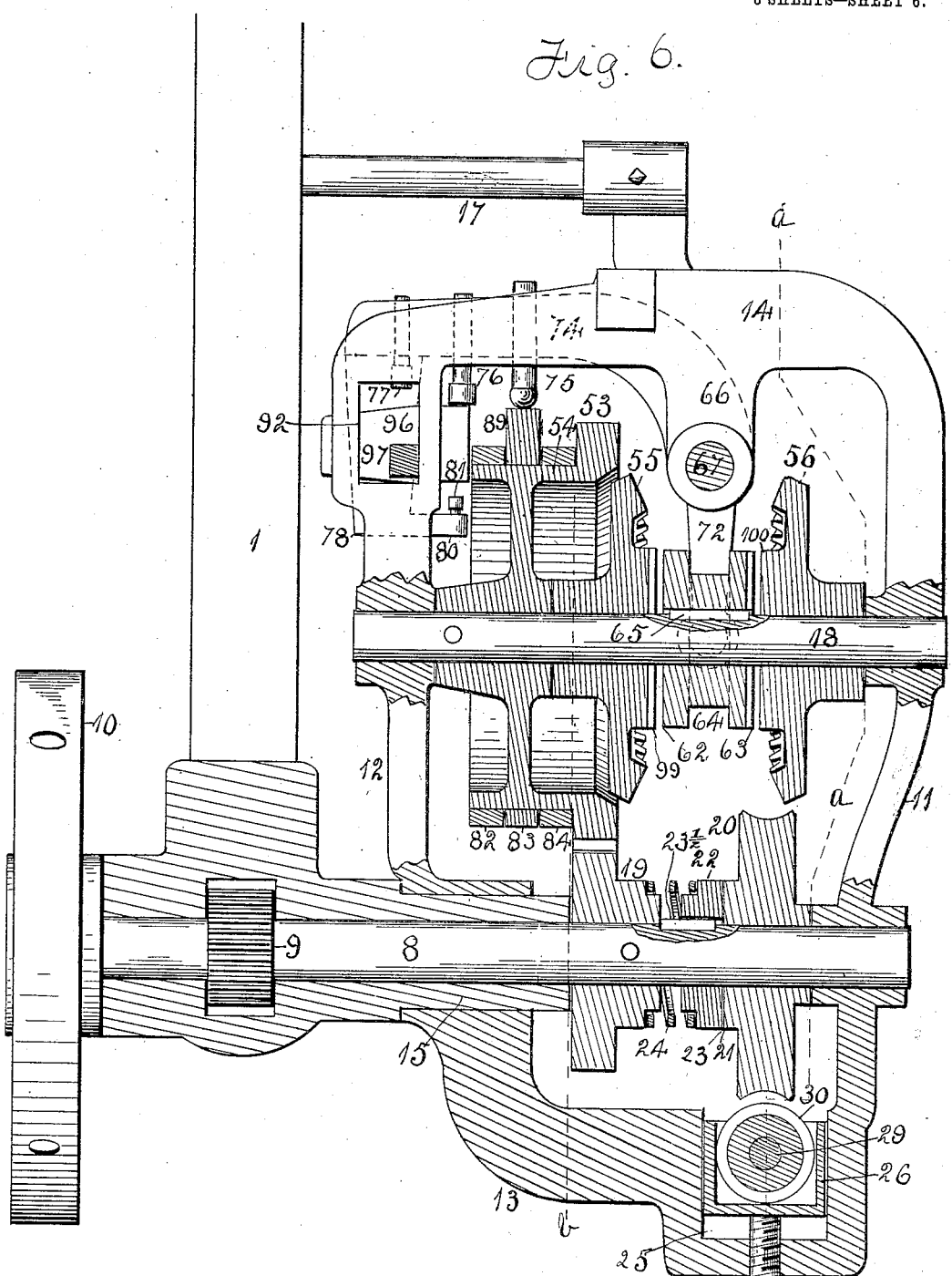

J. P. BARNES.
DRILLING MACHINE.
APPLICATION FILED NOV. 7, 1905.
948,472.
Patented Feb. 8, 1910.
8 SHEETS—SHEET 7.
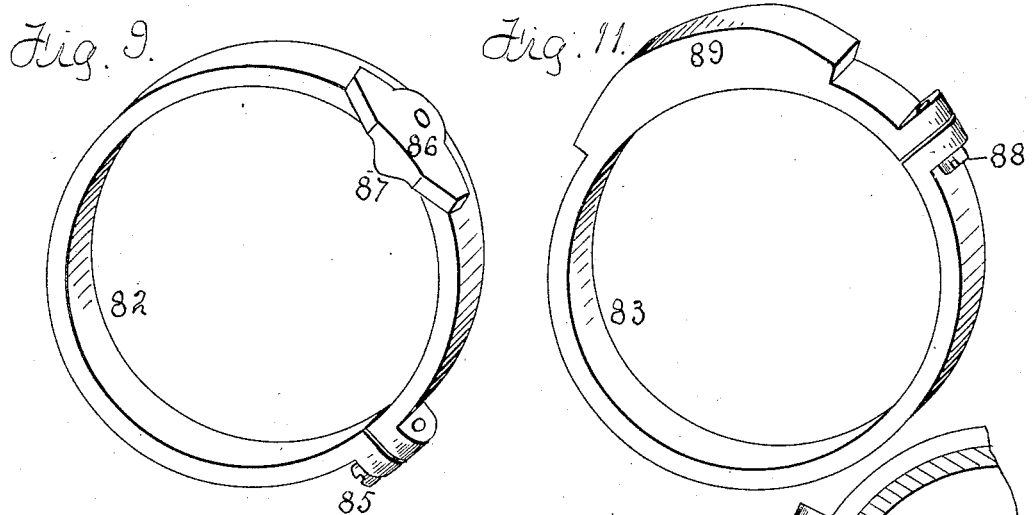
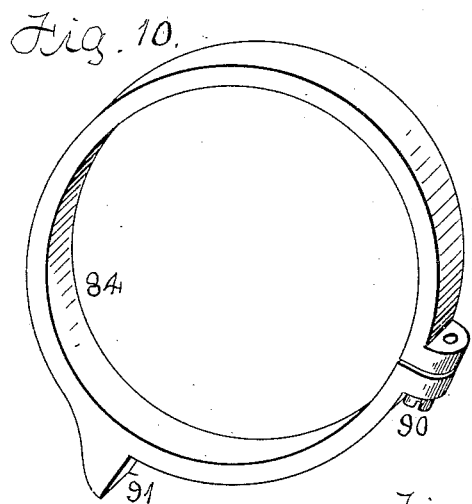
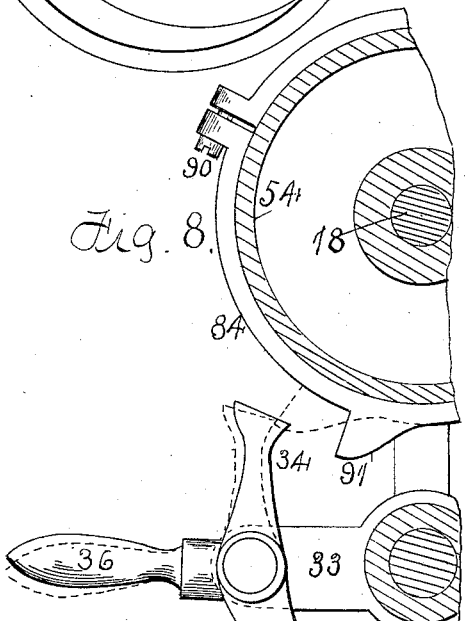
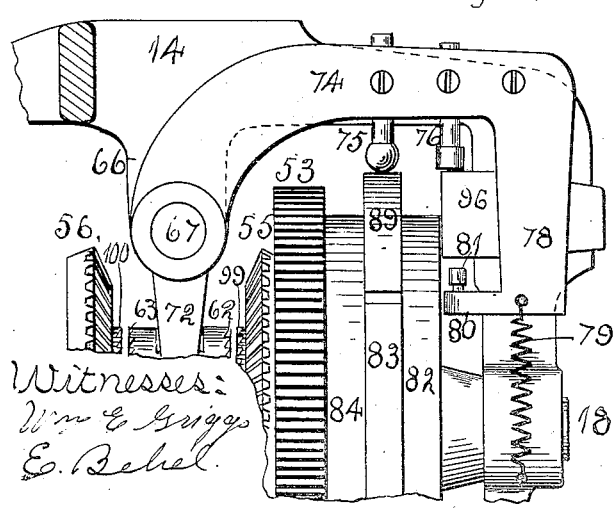
Witnesses:
Wm E Griggs
E. Behel
Inventor:
Joseph P. Barnes.
By A. O. Behel
Atty.

J. P. BARNES.
DRILLING MACHINE.
APPLICATION FILED NOV. 7, 1905.
948,472.
Patented Feb. 8, 1910.
8 SHEETS—SHEET 8.
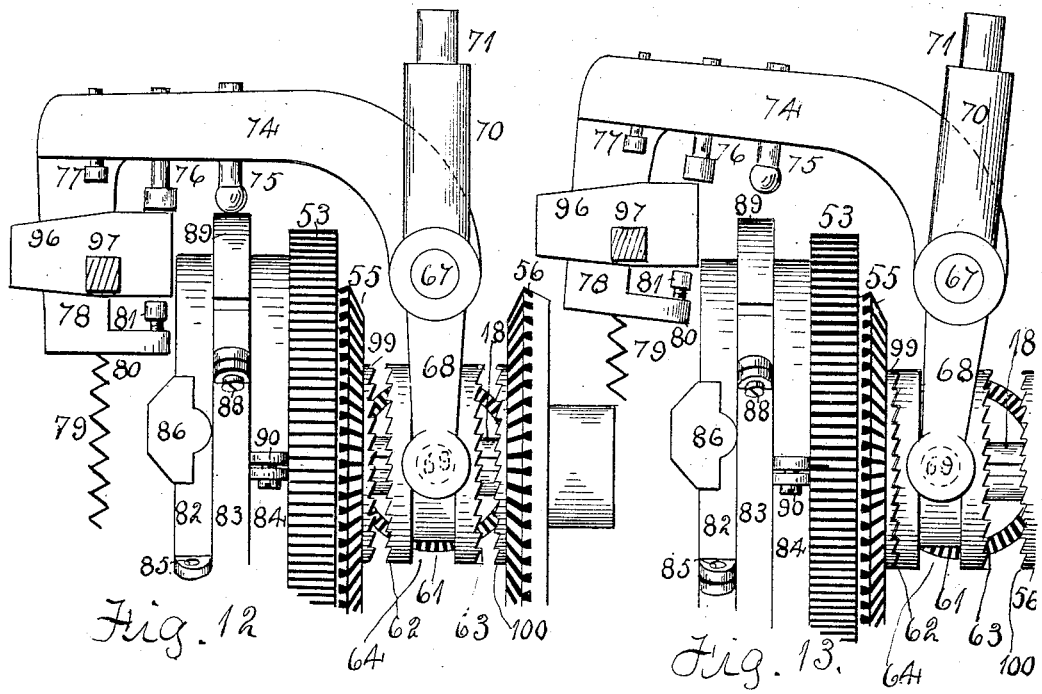
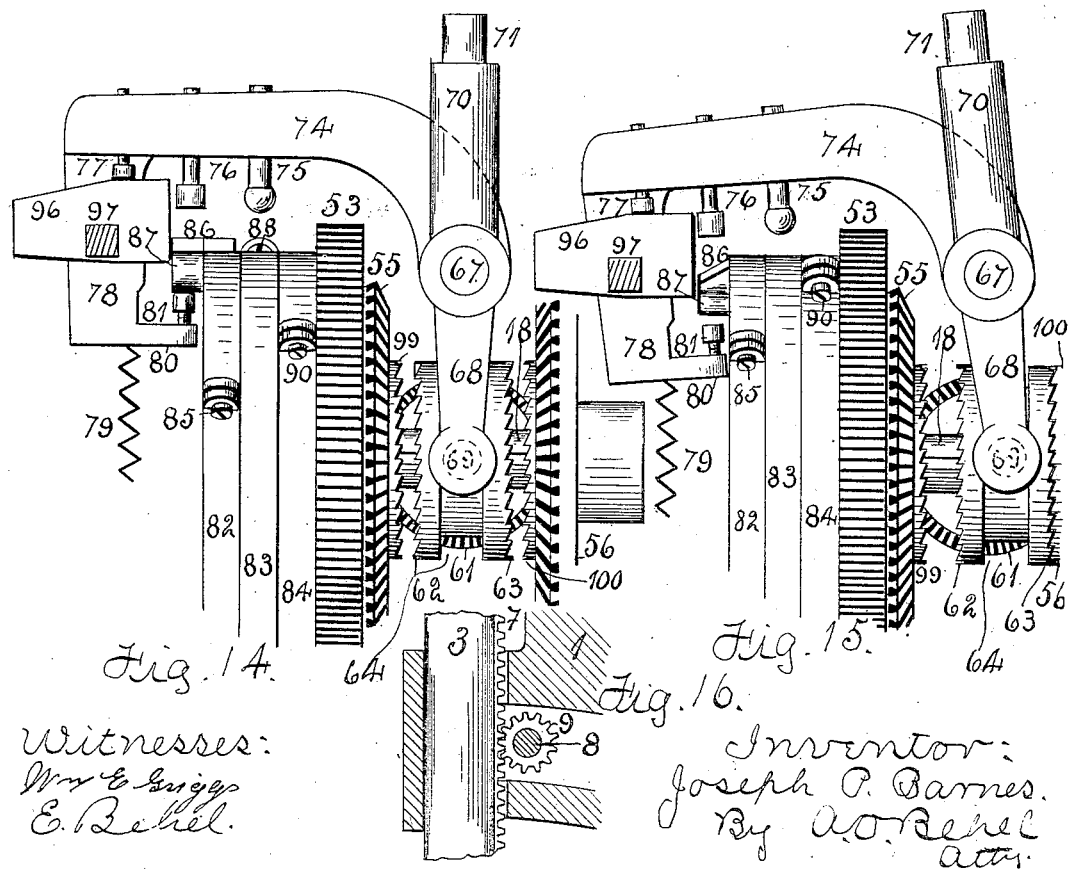
Witnesses:
Wm. E. Griggs
E. Behel
Inventor:
Joseph P. Barnes.
By A. O. Behel
Atty.

UNITED STATES PATENT OFFICE.

JOSEPH P. BARNES, OF ROCKFORD, ILLINOIS, ASSIGNOR TO W. F. & JOHN BARNES COMPANY, OF ROCKFORD, ILLINOIS, A CORPORATION OF ILLINOIS.

DRILLING-MACHINE.

948,472.  Specification of Letters Patent.  Patented Feb. 8, 1910.

Application filed November 7, 1905. Serial No. 286,171.

*To all whom it may concern:*

Be it known that I, JOSEPH P. BARNES, a citizen of the United States, residing at Rockford, in the county of Winnebago and State of Illinois, have invented certain new and useful Improvements in Drilling-Machines, of which the following is a specification.

This invention relates to improvements in machines in which the tool support is capable of a lengthwise movement in order that the tool may be quickly presented to the work, a slow movement imparted to the tool while the work is being done, and a quick return of the tool to its starting position. This result is accomplished by the employment of a double acting clutch located between two constantly rotating clutch faces, the clutch faces rotating in opposite directions, the double acting clutch having a gear connection with the tool support, and devices for limiting the different movements of the tool support.

Figure 1:
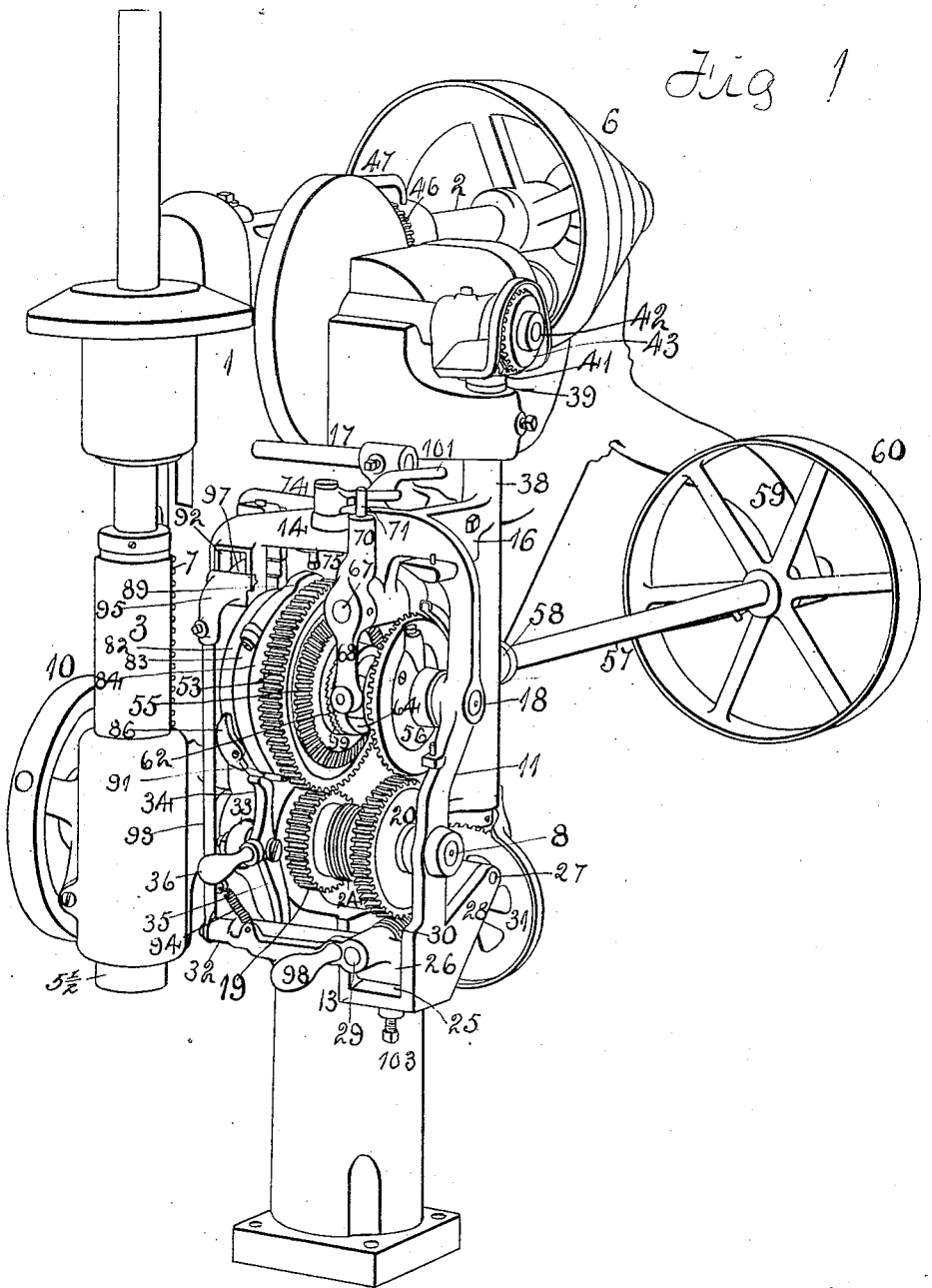
Figure 2:
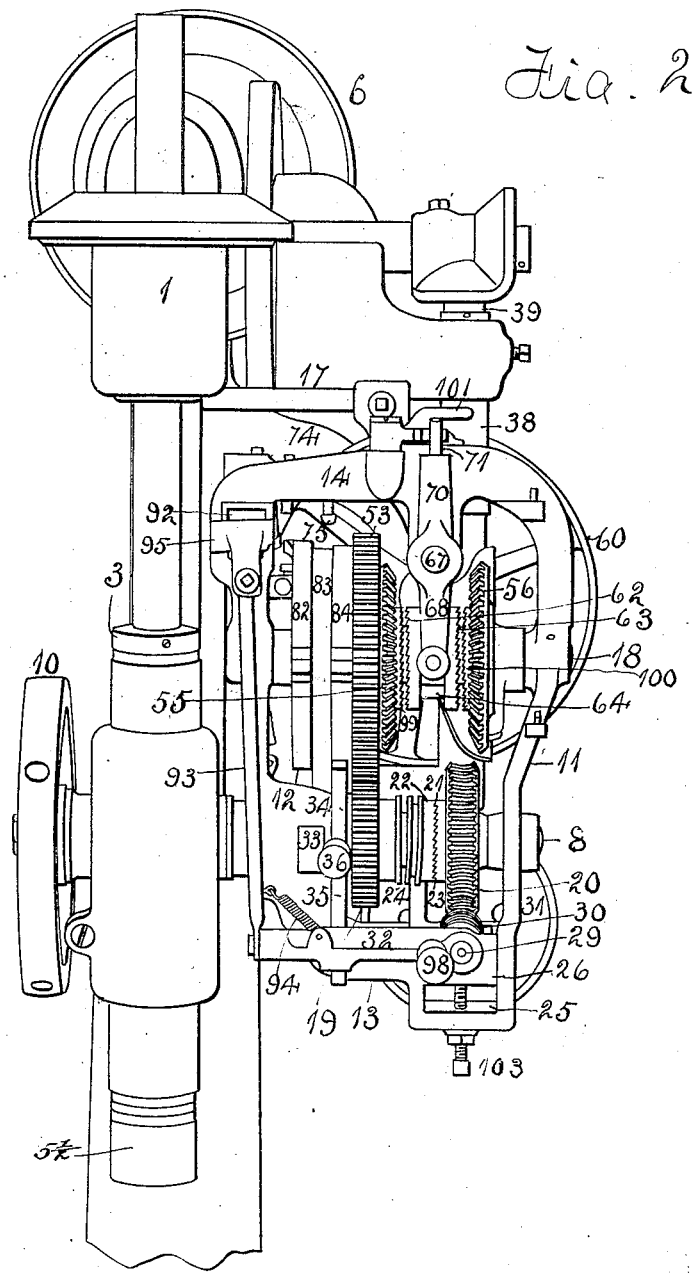
Figure 3:
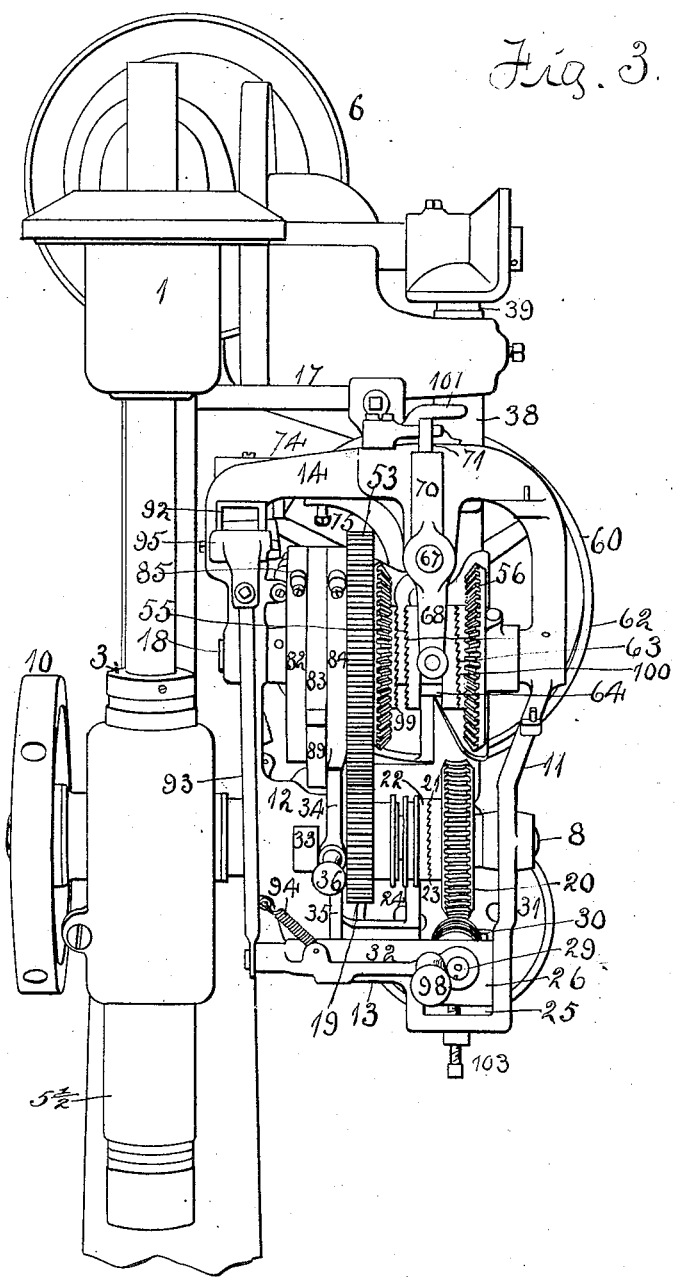
Figure 4:
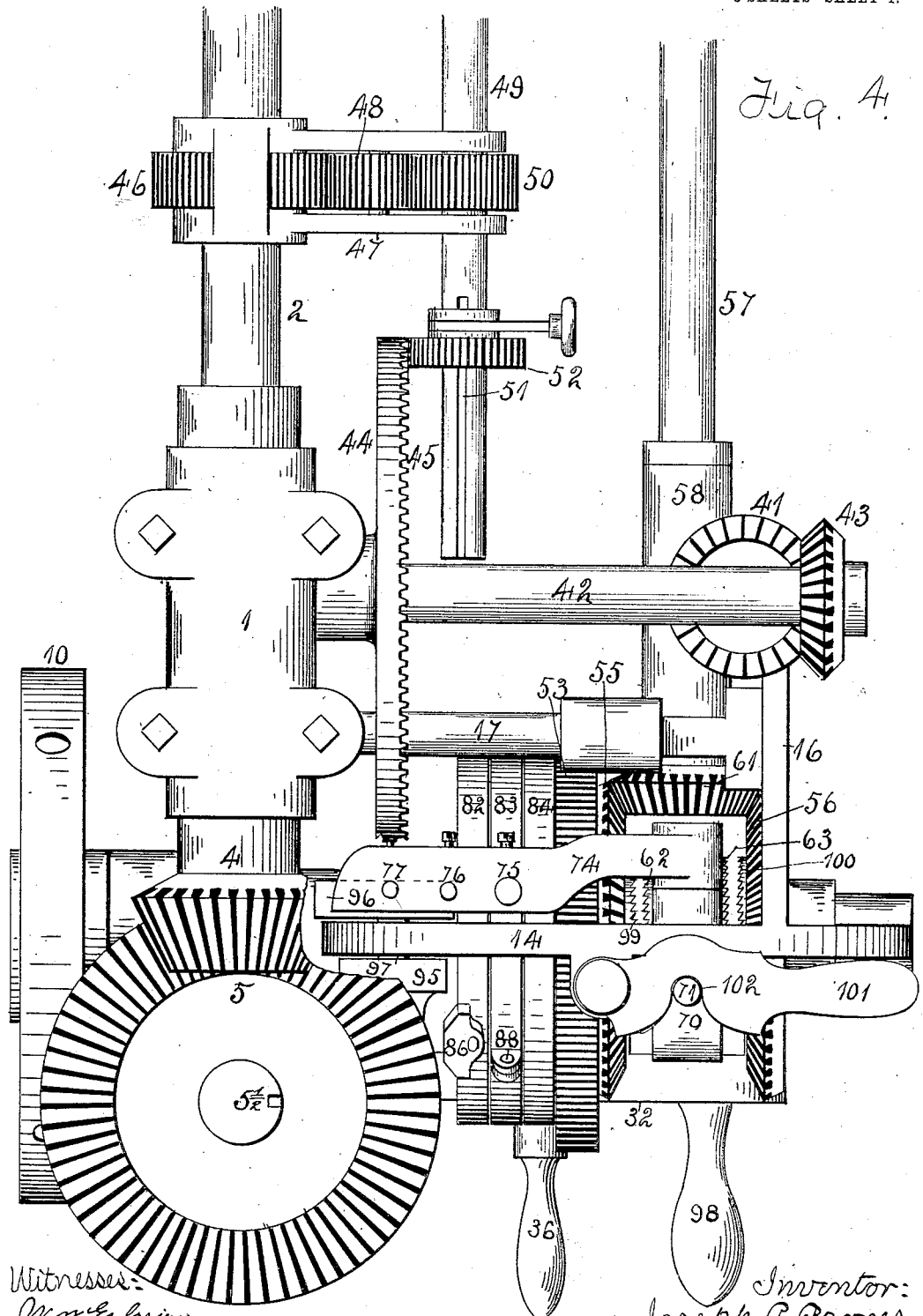

In the accompanying drawings. Figure 1 is a perspective view of my improved drilling machine with the parts in their normal or starting position. Fig. 2 is a front elevation with the tool support lowered to a position to present the tool to the work. Fig. 3 is a front elevation showing the tool support in its lowest position and the parts in a position to begin the return movement of the tool support. Fig. 4 is a partial plan view. Fig. 5 is a vertical section on dotted line *a* Fig. 6. Fig. 6 is a vertical central section through the clutches and through the gearing on the feed-shaft. Fig. 7 is an inner face representation of the inner and upper portion of the tripping device. Fig. 8 is a section on dotted line *b b* Fig. 6. Fig. 9 is an isometrical representation of the device for determining the distance of the quick advance of the tool holder to the work. Fig. 10 is an isometrical representation of the device for determining the distance the tool will continue to work. Fig. 11 is an isometrical representation of the device for stopping the return of the tool support. Figs. 12, 13, 14 and 15 are representations of the tripping devices in their various positions. Fig. 16 is a vertical section of the tool support and its driving pinion.

My improvements are shown applied to what is known as a drill press, said drill press comprising the main frame 1 supporting the main driving shaft 2, and the reciprocating sleeve 3. The bevel gears 4 and 5 form a connection between the main driving shaft and drill-spindle 5½ carried by the sleeve, and as the driving shaft is constantly rotated, the tool support will also be rotated. A belt connection with the cone-pulley 6 mounted on the main driving shaft will impart a rotary movement to the shaft. The sleeve has a toothed rack 7 movable with it. A cross-shaft or feed shaft 8 is supported by the main frame and supports a pinion 9 which meshes with the toothed rack. A hand wheel 10 has a connection with one end of the feed-shaft.

A bracket is supported by the main frame and comprises the two vertical bars 11 and 12, lower bar 13 and top bar 14. The vertical bar 12 is supported by a hub 15 extending from the main frame. An arm 16 extends from the upper bar 14, and has a connection with a rod 17 extending from the main frame.

The feed-shaft 8 has a bearing in the vertical bar 11 of the bracket. A shaft 18 is supported by the two vertical bars 11 and 12, and is located some distance above the feed-shaft 8 and parallel therewith.

To the cross-shaft 8 is pinned a spur-toothed pinion 19, and a worm-wheel 20 is loosely mounted on this cross-shaft. This worm-wheel has a face formed with saw-teeth 21 forming one-half of a clutch.

On the feed-shaft 8 between the pinion 20 and worm-wheel 19 is located a sliding clutch section 22 having one face formed with saw-teeth 23 which engage the saw-teeth of the worm-wheel 20. This clutch section has a slidable connection with the feed-shaft by reason of the feather 23½.

A spring 24 is located between the pinion 19 and the clutch section 22 which serves to hold the clutch section yieldingly in engagement with the clutch face of the worm-wheel.

The lower bar 13 of the bracket is formed with a horizontal rectangular groove-way 25 within which is located a support 26 pivoted at the point 27 between the ears 28 extending rearward from the lower bar 13. This support has a lengthwise central opening within which is located a shaft 29. To the center portion of this shaft 29 is secured a worm 30, and to one end of this shaft is secured a beveled toothed-wheel 31. As the worm 30 is supported in a pivotal manner, it can be moved into engagement with the worm-wheel 20 by means now to be described and can be held in such engagement. From one end of the support 26 extends an arm 32 which is located at right angles thereto. From the vertical bar 12 of the bracket extends a lug 33 to which is pivoted a latch, comprising an upper end 34, a lower hooked end 35 and a handle 36. A spring 37 is located between the lower bar 13 of the bracket, and the lower hooked end of the latch.

When the worm 30 is moved into engagement with the worm-wheel 20 the arm 32 will be raised until the hooked lower end 35 of the latch receives the lower edge of the arm 32 thereby holding the worm in engagement with the worm-wheel as shown at Fig. 8.

The arm 16 supports a tubular bearing 38 within which is located a shaft 39. To the lower end of this shaft is secured a beveled toothed-pinion 40 held in mesh with the bevel toothed-wheel 31. To the upper end of the shaft 39 is secured a miter toothed-wheel 41. A shaft 42 is secured in suitable bearings, to one end of which is secured a miter toothed-wheel 43 meshing with the miter toothed-wheel 41. To the other end of this shaft 42 is secured a plate 44 having a series of concentric rings of teeth 45.

To the main driving shaft 2 is secured a toothed pinion 46. A frame 47 is mounted on the driving shaft 2, and supports a toothed pinion 48, and a shaft 49. This shaft 49 has a toothed pinion 50 secured to it which meshes with the toothed-pinion 48, and it in turn meshes with the toothed pinion 46, thereby forming a driving connection between the main driving shaft 2 and the shaft 49.

The shaft 49 is provided with a lengthwise groove 51, a toothed pinion 52 has a feather connection with the groove, in order that it may be moved bodily in the lengthwise direction of the shaft so that it may be placed in engagement with the various concentric rings of teeth 45.

Thus far described, a rotary movement is imparted to the drill-spindle by the gear connection with the main driving shaft 2.

By reason of the gear connection between the main driving shaft and the worm-wheel 20, when the worm 30 is in engagement with the worm-wheel, and a connection between the worm-wheel 20 and feed-shaft 8 through the clutch faces 21 and 23 in engagement, the cross-shaft will be rotated, and the toothed pinion 9 connected therewith being in engagement with the toothed rack 7, the toothed rack will be moved downward toward the work, and as the toothed rack is a part of the sleeve supporting the tool, the tool carried by the support will engage the work.

In some of the figures of the drawing the gearing is covered, but in other figures the gearing is shown.

To the shaft 18 is pinned a spur toothed-wheel 53 which meshes with the toothed pinion 19 pinned to the feed-shaft 8. This spur toothed-wheel 53 has a flange 54 extending from it. Upon the shaft 18 is loosely mounted two beveled toothed-wheels 55 and 56 facing each other.

A shaft 57 is supported in bearings 58 and 59 and is rotated by a belt that operates on the pulley 60 connected therewith, said belt being driven from any suitable source of power. This shaft 57 has a bevel toothed pinion 61 secured to it which meshes with the bevel toothed-wheels 55 and 56 and which is constantly rotated, thereby imparting a rotary movement to one of the bevel toothed-wheels in one direction and a rotary movement to the other bevel toothed-wheel in the opposite direction.

On the shaft 18 between the bevel toothed-wheels 55 and 56 is located a clutch having the saw-toothed faces 62 and 63, and a circumferential groove 64. This clutch has a sliding connection with the shaft 18 by the feather 65 engaging a groove in the clutch.

From the upper bar 14 of the bracket depends an arm 66 having a transverse opening within which is located a short shaft 67. To one end of this shaft is pinned an arm having a depending end 68 provided with a stud 69 entering the annular groove 64 of the clutch, and an uprising section 70 having a stud 71 extending from its upper end. To the other end of this short shaft 67 is pinned a bell-crank lever having one branch 72 depending from the shaft and provided with a stud 73 entering the annular groove 64 of the clutch, and the other branch 74 extending at substantially right angles to the branch 72. This branch 74 supports three studs 75, 76 and 77, which are made adjustable in the direction of their length, and held when adjusted by a set screw for each stud.

From the free end of the branch 74 depends an arm 78 to the lower end of which is connected a spiral spring 79, the lower end of the spring being connected to a stationary part of the device. From the lower end of the arm 78 extends a wing 80 which supports a screw 81.

The flange 54 of the spur toothed-wheel 53 supports three rings 82, 83 and 84 shown at Figs. 9, 10 and 11. The ring shown at Fig. 9, is split and its ends are connected by the screw 85, and by means of this screw, the ring is clamped in engagement with the flange in a manner to permit its adjustment axially around the flange. This ring has a cam-surface 86 projecting beyond one of its edges, and the cam-surface has a portion 87 extending toward the center of the ring.

The ring 83 is clamped in connection with the flange 54 by the screw 88 and has a cam-surface 89 extending from its face.

The ring 84 is clamped in connection with the flange 54 by the screw 90, and has a projection 91 extending from its face. The ring 84 is clamped in connection with the flange so that its projection 91 will engage the upper end 34 of the latch. The ring 83 is so located in connection with the flange 54 that the cam-surface 89 will engage the stud 75, and the ring 82 is located in connection with the flange 54 at its outer edge. The bar 12 of the bracket has its upper portion provided with a rectangular opening 92.

To the free end of the arm 32 is pivoted a rod 93 and a spring 94 has one end connected to the rod, and its other end to the arm. To the upper end of the rod 93 is secured a floating dog comprisng the front plate 95, a rear plate 96, and a stem 97 connecting the plates. The stem is located in the rectangular opening 92 in the upper portion of the bar 12. The rear plate 96 is located beneath the studs 76 and 77 depending from the branch 74 of the bell-crank lever.

In Figs. 1, 4, 5, 6, and 7 the parts are in the positions they occupy when the sleeve and drill-spindle are elevated, the tool, and the bevel toothed gears 55 and 56 are rotating idly and the clutch between the bevel toothed-wheels 55 and 56 stands free of both wheels.

The operation of the gearing is as follows: The worm 30 is elevated into engagement with the worm-wheel 20 by moving the handle 98 upwardly, the latch will hold the worm in such engagement as before described. A connection is thus formed between the main driving shaft 2 and the tool support, and the main shaft will impart a slow downward movement to the tool support, such as is necessary in drilling or other work the tool may be required to do. The upward movement of the worm will carry the arm 32 upward, and will elevate the floating dog through its rod connection with the arm. The stud 76 of the bell-crank resting on the upper edge of the rear plate 96 of the floating dog forms a connection between the floating dog and bell-crank lever, and when the floating dog is elevated the bell-crank lever will be rocked, which will move the clutch located between the bevel toothed-wheels 55 and 56 so that its toothed face 62 will interlock with the teeth 99 of the bevel toothed-wheel 55 as shown at Fig. 13. This connection will impart a rotary movement through the spur toothed-wheel 53 and pinion 19 to the feed-shaft 8, and through the pinion 9 to the toothed-rack 7 of the sleeve in a downward direction. The gear connection between the pulley 60 and sleeve is such that the sleeve will have a quick downward movement, and the clutch connection with the worm-wheel on the feed-shaft 8 will click ahead of the worm-wheel. As the toothed-wheel 53 is given a partial rotation during the quick downward movement of the tool support the rings 82, 83 and 84 will be carried with it. The ring 82 is adjusted in connection with the flange 54 of the toothed-wheel so that when the tool holder has descended the proper distance, the cam-surface 86 of the ring will engage the rear plate 96 of the floating dog and move the upper end of the floating dog so that the rear plate of the floating dog will move free of the stud 76 thereby allowing the bell-crank to descend until the stud 77 rests in contact with the upper edge of the rear plate 96 of the floating dog as shown at Fig. 14. This movement of the bell-crank will move the clutch located between the bevel toothed-wheels 55 and 56 free of the bevel toothed-wheel 55, which will break the driving connection with the toothed-wheel 53, and stop the quick descending movement of the sleeve. The sleeve will carry the tool downward slowly through its connection with the worm-wheel 20, which will move the toothed-wheel 53 slowly in the same direction it was moving while a quick movement was being imparted to the tool support.

When the tool has finished its work, the projection 91 carried by the ring 84 will engage the upper end 34 of the latch and move the latch sufficiently to release its lower hooked end 35 from engagement with the arm 32, thereby permitting the arm 32 to drop, carrying the worm 30 with it, which will disengage the worm from the worm-wheel 20 and stop the slow downward movement of the tool. This dropping movement of the arm 32 will carry the floating dog with it, thereby permitting the bell-crank to move which will move the clutch located between the bevel toothed-wheels 55 and 56 into engagement with the teeth 100 of the bevel toothed-wheel 56, thereby forming a connection between the pulley 60 and the sleeve, which will move the toothed-wheel 53 in a direction opposite to that at which it was previously moving as shown at Fig. 15. This movement of the toothed wheel 53, will through its gear connection with the sleeve impart a quick return movement to the sleeve until the cam-surface 89 of the ring 83 comes in contact with the stud 75, which will move the bell-crank, and through it move the clutch from engagement with the bevel toothed-wheel 56 into a position where it will be free of both bevel toothed-wheels 55 and 56 and will remain at rest. Upon the last movement being imparted to the bell-crank the stud 75 will be elevated sufficiently to permit the spring 94 to move the floating dog laterally so that the rear plate 96 thereof will come to rest beneath the stud 76, when all parts will assume their normal positions. The spring 79 is employed to move the clutch from its engagement with the bevel toothed-wheel 55 into engagement with the bevel toothed-wheel 56. The cam-surface 87 on the ring 82 will engage the screw 81 and move the bell-crank, should the spring 79 fail to move it. By this arrangement the tool is given a quick advance to the work, a slow movement while doing its work, and a quick return after the work has been completed. It is only necessary to raise the handle 98 to start the mechanism in operation, when the various movements are automatically accomplished. By pressing down on the handle 36 extending from the latch, the tool support can be instantly returned to its normal or starting position.

To the top bar 14 of the bracket is pivoted a lever 101 having a cam-notch 102 in its front edge. By means of this lever the projection 71 extending from the arm 70 will be received in the cam-notch which will hold the sliding clutch free of both wheels 55 and 56 when the sleeve and drill spindle can be reciprocated by means of the hand wheel 10.

The set screw 103 limits the downward movement of the worm support.

I claim as my invention.

1. In a drilling machine, the combination with a rotatable tool carrier, of a feeding device therefor, means for effecting a working feed of the device, and mechanism associated with said device for feeding and returning the carrier at an accelerated speed, said mechanism including one means separate from the working feed means for feeding, and another means separate from the working feed means for returning the same.

2. In a drilling machine, the combination with a rotatable tool carrier, of a feed shaft therefor, means for effecting a working feed of the shaft, and mechanism associated therewith for feeding and returning the carrier at an accelerated speed, said mechanism including separate devices independent of the working feed means for respectively feeding and returning the tool carrier, and means for alternately connecting the devices with the shaft.

3. In a drilling machine, the combination with a rotatable tool carrier, of a feed shaft geared to the tool carrier, a device for automatically rotating the shaft in one direction, another device for automatically rotating the shaft in an opposite direction, and means controlled by the operation of the shaft for operatively connecting one of the devices with the shaft.

4. In a drilling machine, the combination with a rotatable tool carrier, of a feed shaft geared thereto, means for effecting a working feed of the shaft, and mechanism for feeding and returning the tool carrier at an accelerated speed including oppositely rotating devices separate from the working feed means, and means automatically operated by the mechanism when the tool carrier reaches predetermined positions for operatively connecting one device to the carrier.

5. In a drilling machine, the combination with a rotatable tool carrier, of means for effecting a working feed of the carrier, and mechanism for feeding and returning the tool carrier at an accelerated speed including a shaft, oppositely rotating devices associated with the shaft, and means controlled by the operation of the shaft for operatively connecting either device to the shaft.

6. In a drilling machine, the combination with a rotatable tool carrier, of means for effecting a working feed of the carrier, and mechanism for feeding and returning the tool carrier at an accelerated speed, said mechanism including a shaft separate from the working feed means, gears loosely mounted thereon, means for continuously rotating the gears in opposite directions, and means for connecting either gear to the shaft.

7. In a drilling machine, in combination, a rotatable drill spindle, means for feeding and returning said spindle, means for accelerating the feeding of said spindle, manually controlled means for effecting the feeding of said spindle at one speed, and causing its feed at an accelerated speed, automatic means for effecting the return of said spindle at an accelerated speed, and manually controlled means for disengaging said feeding means and effecting the return of said spindle at an accelerated speed, and manually controlled means for disengaging said spindle feeding and returning means whereby to hold the spindle in one position.

8. In a drilling machine, the combination with a rotatable tool carrier, of a feed shaft therefor, means for effecting a working feed of the shaft, separate devices independent of the working feed means for respectively effecting an accelerated feed and return of the carrier, means for operating said devices, and means for connecting either device to the shaft.

9. In a drilling machine, in combination, a rotatable and longitudinally movable drill spindle, a feed shaft for the spindle, a worm wheel loosely mounted on the feed shaft, a clutch connection between the worm wheel and feed shaft to permit the shaft to over-run the worm wheel, a worm held normally out of engagement with the worm wheel but capable of being placed in engagement therewith, means for rotating the worm, a quick feed mechanism and a quick return mechanism having a detachable connection with the feed shaft, means for simultaneously placing the quick feed mechanism in engagement with the feed shaft and the worm in engagement with the worm wheel, and devices carried by said quick feed mechanism for automatically determining the length of the movements of the spindle.

10. In a drilling machine, in combination, a rotatable and longitudinally movable drill spindle, a feed shaft for the spindle, a worm wheel loosely mounted on the feed shaft, a clutch connection between the worm wheel and feed shaft to permit the shaft to over-run the worm wheel, a worm held normally out of engagement with the worm wheel but capable of being placed in engagement therewith, means for rotating the worm, a quick feed mechanism and a quick return mechanism having a detachable connection with the feed shaft, means for simultaneously placing the quick feed mechanism in engagement with the feed shaft and the worm in engagement with the worm wheel, and adjustable devices carried by said quick feed mechanism for automatically determining the length of the movements of the spindle.

11. In a drilling machine, in combination, a rotatable and longitudinally movable drill spindle, a feed shaft for the spindle, a worm wheel loosely mounted on the feed shaft, a clutch connection between the worm wheel and feed shaft to permit the shaft to over-run the worm wheel, a worm journaled in a movable support and held normally out of engagement with the worm wheel but capable of being placed in engagement therewith, means for rotating the worm, a secondary shaft located parallel with the feed shaft, a pinion fixedly connected to the feed shaft, a spur-toothed wheel loosely mounted on the secondary shaft and meshing with the last-mentioned pinion, a double faced clutch splined on the secondary shaft, two beveled toothed wheels loosely mounted on the secondary shaft and located on each side of the clutch section and each provided with a clutch face, a bevel toothed pinion meshing with both of the bevel toothed wheels, means for turning said bevel toothed pinion, means connecting the worm support and the clutch section for effecting an engagement between a pair of clutch members, and means carried by the spur toothed wheel for moving the clutch section.

12. In a drilling machine, the combination with a rotatable tool spindle, of a shaft geared to the tool spindle to reciprocate the same, oppositely rotating gear wheels loosely mounted on the shaft, clutch means for connecting either gear wheel to the shaft, means controlled by the operation of the shaft for controlling the clutch means, and driving means geared to both wheels and continuously rotating the same in opposite directions.

13. In a drilling machine, the combination with a rotatable and reciprocatory tool spindle, of a feed shaft therefor, a counter shaft geared to the feed shaft, gears loosely journaled on the countershaft, driving means continuously rotating said gears in opposite directions, a clutch member located between the gears for connecting either to the countershaft, and means controlled by the operation of the machine for shifting the clutch member.

14. In a drilling machine, the combination with a rotatable tool carrier, of means for effecting a working feed of the carrier, mechanism for feeding and returning the carrier at an accelerated speed, said mechanism including one means for feeding and another means for returning the carrier, and devices automatically operated upon the feed movement of the tool carrier for effecting the change from one to the other.

15. In a drilling machine, the combination with a rotatable tool carrier, of means for effecting a working feed of the carrier, and mechanism for feeding and returning the carrier at an accelerated speed including separate oppositely operating devices, and means automatically operated upon the movement of the tool carrier for connecting one of the devices to and disconnecting the other from the tool carrier.

16. In a drilling machine, the combination with a rotatable and reciprocatory tool spindle, of a shaft geared thereto, means for effecting a working feed of the spindle, clutch elements rotatably mounted on the shaft, means for continuously rotating said clutch elements in opposite directions, another clutch element rotatable with and movable along the shaft into and out of coaction with the first mentioned clutch elements, and means automatically operated upon the movement of the tool carrier for effecting the movement of the movable clutch element.

17. In a drilling machine, the combination with a rotatable and reciprocatory tool carrier, of means for feeding the same at a working speed, separate devices for respectively feeding and returning the tool carrier at an accelerated speed, and means operated by said mechanism for positively changing from the feed to the return device.

18. In a drilling machine, the combination with a reciprocatory and rotatable tool carrier, of means for feeding the tool carrier at a working speed, mechanism for feeding and returning the tool carrier at an accelerated speed including separate oppositely moving devices and means operated by said mechanism for disconnecting one device from and connecting the other to the tool carrier.

19. In a drilling machine, the combination with a rotatable and reciprocatory tool carrier, of means for feeding the tool carrier at a working speed, mechanism for feeding and returning the tool carrier at an accelerated speed including separate oppositely moving devices, a shiftable clutch element for connecting either device to the tool carrier, and means operated by said mechanism for automatically effecting the shifting operation of the clutch.

20. In a drilling machine, the combination with a rotatable and reciprocatory tool spindle, of means for feeding the same at a working speed, mechanism for feeding and returning the tool carrier at an accelerated speed including a shaft, oppositely rotating gear wheels journaled on the shaft, driving means for continuously rotating said gear wheels in opposite directions, a clutch element located on the shaft between the wheels and movable into engagement with both, and means operated by the mechanism for automatically shifting the clutch element.

21. In a drilling machine, the combination with a rotatable and reciprocatory tool spindle, of means for feeding the same at a working speed, means for feeding the same at an accelerated speed, means for returning the spindle at an accelerated speed, and automatic mechanism controlled by the operation of the machine for effecting the following operations in the order named, to-wit: disconnecting the accelerated feed means from the tool spindle, disconnecting the working feed mechanism from the tool spindle, connecting the accelerated return means to the tool spindle, and disconnecting the same therefrom.

22. In a drilling machine, the combination with a rotatable and reciprocatory tool spindle, of means for feeding the same at a working speed, means for feeding the same at an accelerated speed, means for returning the spindle at an accelerated speed, automatic mechanism controlled by the operation of the machine for effecting the following operations in the order named, to-wit: disconnecting the accelerated feed means from the tool spindle, disconnecting the working feed mechanism from the tool spindle, connecting the accelerated return means to the tool spindle, and disconnecting the same therefrom, and manually operated means for connecting the working speed feed mechanism and the accelerated speed feed means to the spindle.

23. In a drilling machine, in combination, a rotatable and longitudinally movable drill spindle, automatic quick feeding means and work feeding and quick returning means for the spindle, means for imparting movement to said quick feeding and returning means, said means comprising two bevel toothed wheels, a bevel toothed pinion meshing with said wheels, means for turning said pinion, a clutch located intermediate said wheels and adapted to be moved in connection therewith, whereby to receive movement therefrom, and a gearing connection between said clutch and the spindle whereby to effect the feeding and return thereof.

24. In a drilling machine, the combination with a rotatable and reciprocatory tool spindle, of mechanism for feeding the same at a working speed, means for feeding the spindle at an accelerated speed, manually operated mechanism for simultaneously connecting the accelerated speed feed mechanism and working speed feed means to the tool spindle, and automatic means controlled by the operation of the machine for successively disconnecting said mechanism and means therefrom.

25. In a drilling machine, the combination with a tool spindle, of means for effecting the feed of the same at a working speed, oppositely operating actuating devices, a clutch element for connecting either device to the spindle, manually operated means for moving the clutch element to connect one device to the spindle, and mechanism automatically operated by the machine for moving the clutch to disconnect said device and afterward connect the other device to the tool spindle.

26. In a drilling machine, the combination with a reciprocatory and rotatable tool spindle, of means for feeding the same at a working speed, oppositely operating actuating devices, a clutch element for connecting either device to the spindle, manually operated means for moving the clutch element to connect the working feed means and one device to the spindle, automatic mechanism for moving the clutch to disconnect said device while the working feed means is still connected to the spindle, and means for automatically disconnecting the working feed means, said mechanism automatically connecting the other device to the spindle after the working feed means has been disconnected therefrom.

27. In a drilling machine, the combination with a rotatable and reciprocatory tool spindle, of oppositely rotating devices for moving the same in opposite directions, a clutch element for connecting either device to the spindle, an arm for moving the clutch element, and rotatable devices coöperating with and controlling the position of the arm.

28. In a drilling machine, the combination with a rotatable and reciprocatory tool spindle, of means for feeding the same at a working speed, means for feeding and returning the spindle at an accelerated speed, including a shaft, gear wheels loosely mounted on the shaft, means for continuously rotating the gear wheels in opposite directions, a clutch element for connecting the gear wheels to the shaft, a bell crank connected to the clutch element, a drum fixed to the shaft, and devices mounted on and rotatable with the drum, said devices engaging the crank to determine its position and consequently the position of the clutch element.

29. In a drilling machine, the combination with a tool spindle, of a feed shaft geared thereto, means for operating the feed shaft to effect a working feed of the spindle, gearing connected to the feed shaft, driving mechanism detachably engaging the gearing for effecting the feed and return of the spindle at an accelerated speed, and means operated by the gearing for automatically governing the operation of the accelerated feed mechanism, said gearing transmitting motion from the mechanism to the shaft and also transmitting motion from the shaft to the controlling means.

30. In a drilling machine, the combination with a tool spindle, of a feed shaft geared thereto, means for operating the feed shaft to effect a working feed of the spindle, driving mechanism for effecting the feed and return of the spindle at an accelerated speed, gearing connecting said mechanism with the shaft, and means operated by the gearing for automatically governing the operation of the accelerated feed mechanism, said gearing alternately transmitting motion from the mechanism to the shaft and from the shaft to the automatically governing means.

JOSEPH P. BARNES.

Witnesses:
W. F. BARNES,
A. O. BEHEL.